United States Patent [19]

Lindemann

[11] 3,860,390

[45] Jan. 14, 1975

[54] DYE COMPOSITION OF BENZYL ALCOHOL, PHENYL GLYCOL ETHER AND OCTYLPHENYL PENTAGLYCOL ETHER

[76] Inventor: Wolfgang Lindemann, Mondenweg 24, 51 Inzlingen, Germany

[22] Filed: Apr. 17, 1973

[21] Appl. No.: 351,837

[30] Foreign Application Priority Data
Apr. 17, 1972 Switzerland.......................... 5636/72

[52] U.S. Cl................................. 8/93, 8/173, 8/168
[51] Int. Cl............................................... D06p 1/82
[58] Field of Search.................................. 8/173, 93

[56] References Cited
UNITED STATES PATENTS
3,313,590  4/1967  Delano.................................. 8/173

3,467,484  9/1969  Hermes.............................. 8/173 X
3,478,376  11/1969  Daueble............................. 8/93 X
3,667,900  6/1972  Trimble................................. 8/173

FOREIGN PATENTS OR APPLICATIONS
682,830  1/1966  Belgium................................... 8/93

*Primary Examiner*—Donald Levy
*Attorney, Agent, or Firm*—Gerald D. Sharkin; Richard E. Vila; Thomas C. Doyle

[57] ABSTRACT

A novel two or three component composition comprising benzyl alcohol, monophenyl glycolether and optionally octylphenyl pentaglycolether, is useful as an assistant for printing pastes or dyeliquors.

6 Claims, No Drawings

DYE COMPOSITION OF BENZYL ALCOHOL, PHENYL GLYCOL ETHER AND OCTYLPHENYL PENTAGLYCOL ETHER

This invention relates to a novel two or three component assistant for printing pastes and dyeliquors.

Thus the invention provides a composition for use as an assistant for printing pastes or dyeliquors, which consists essentially of (a) 0 to 30% by weight of octylphenyl pentaglycolether, (b) 20 to 70% by weight of benzyl alcohol, and (c) 30 to 80% by weight of monophenyl glycolether, totalling 100% by weight.

The invention also provides a method of preparing printing pastes or dyeliquors comprising a dye and water, which comprises admixing with such pastes or liquors an assistant of (a) octylphenyl pentaglycolether, (b) benzyl alcohol and (c) monophenyl glycolether in relative proportions a: b: c of 0 to 30: 20 to 70: 30 to 80 parts by weight, providing the total parts are 100.

Of component (a), preferably zero or 1 to 30, preferably 10 to 20, or in particular 15 per cent. by weight are employed, of component (b) preferably 30 to 50 or in particular 35 to 45 per cent. by weight, and of component (c) preferably 29 or 30 to 50, more preferably 35 to 50 or in particular 40 to 45 per cent. by weight.

The amounts of the composition employed usually range from 1 to 100, preferably 20 to 70 or in particular 20 to 50 grams per kilogram of the printing paste or dyeliquor.

The printing pastes and dyeliquors may contain in principle dyes of any desired class but preferably they contain acid and premetallized dyes as are described in the Colour Index, Third Edition, Volumes 1 to 3.

Printing pastes and dyeliquors containing the said composition are applicable respectively by the conventional printing processes and the conventional continuous padding processes, in particular on textiles of 100% polyamide fibre and blends containing a polyamide component and/or a cationic-active group modified polypropylene. Important classes of textiles of this fibre composition are carpets and nonwovens. The term "polyamide fibres" covers natural fibres such as wool and synthetic fibres such as nylon 6, 66, 610 and related types.

The printing pastes and dyeliquors may be prepared and applied in accordance with conventional methods, for example the method described in the Journal of the American Association of Textile Chemists and Colorists, August 1970, pages 273–278.

The composition according to this invention is low foaming and exercises only slight retarding action on dyes, so that shorter fixation times are realizable for acid and premetallized dyes, with at the same time good colour yields. In addition it imparts a good anti-frosting effect.

The invention also provides a method of printing or dyeing, which comprises applying a printing paste or dyeliquor which comprises a dye, water and an assistant of (a) octylphenyl pentaglycolether, (b) benzyl alcohol and (c) monophenyl glycolether in relative proportions a: b: c of 0 to 30: 20 to 70: 30 to 80 parts by weight, provided the total parts are 100, to a substrate.

In the following Examples the parts and percentages are by weight and the temperatures in degrees centigrade.

EXAMPLE 1

A printing paste of the following composition is prepared:

6 parts of the dye C.I. Acid Brown 298
30 parts of urea
406 parts of boiling water
500 parts of flour starch thickening 3%
40 parts of a mixture of
    15 per cent. by weight of octylphenyl pentaglycolether
    40 per cent. by weight of benzyl alcohol and
    45 per cent. by weight of monophenyl glycolether
20 parts of acetic acid.

The paste is applied to a tufted carpet of polyamide 6.6 yarn on a "Zimmer" rotary printing machine and the print continuously fixed by steaming for 4 minutes at 102°. The carpet is washed off in cold water and dried.

EXAMPLE 2

Two dye solutions of the following composition are prepared:

a)   3 parts of the dye C.I. Acid Orange 67
    10 parts of butyl diglycolether
    637 parts of boiling water
    300 parts of flour starch thickening 3%
    30 parts of a mixture of
        15 per cent. by weight of octylphenyl pentaglycolether
        40 per cent. by weight of benzyl alcohol and
        45 per cent. by weight of monophenyl glycolether
    20 parts of acetic acid.

b)   8 parts of the dye C.I. Acid Red 151, 190%
    10 parts of butyl diglycolether
    432 parts of boiling water
    500 parts of flour starch thickening 3% (for example, of locust bean or guarana flour)
    30 parts of a mixture of
        15 per cent. by weight of octylphenyl pentaglycolether
        40 per cent. by weight of benzyl alcohol and
        45 per cent. by weight of monophenyl glycolether
    20 parts of acetic acid.

Circular knit fabric of polyamide 6 carpet yarn, made for experimental purposes, is continuously conveyed through solution (a) and then through a pair of rubber rolls, where it is expressed to retain 100% of dye solution on the dry weight. The fabric is then printed with solution (b), applied from a raised engraved design on the printing roller. It is steamed for 4 minutes at 102° for fixation and finally dried.

Comparable results are obtained when the assistant in the padding liquor and printing paste is employed in the ratio of 20:35:45 or 10:45:45: instead of 15:40:45.

EXAMPLE 3

A solution is prepared with the following additions:

5 parts of the dye C.I. Acid Red 299
30 parts of urea
840 parts of boiling water
100 parts of flour starch thickening 3%
20 parts of a mixture of
    45 per cent. by weight of benzyl alcohol and
    55 per cent. by weight of monophenyl glycolether
5 parts of monosodium phosphate.

The solution is applied to a polyamide 6 tufted carpet on a "Küsters" carpet dyeing range at an expression giving a pick-up of 400% on the dry weight. The dyeing is fixed immediately by a passage of 5 minutes through a festoon steamer and the carpet finally washed off and dried.

What is claimed is:

1. A composition for use as an assistant for printing pastes or dyeliquors, which consists essentially of (a) 1 to 30% by weight of octylphenyl pentaglycolether, (b) 20 to 70% by weight of benzyl alcohol, and (c) 29 to 80% by weight of monophenyl glycolether, totalling 100% by weight.

2. A composition according to claim 1, in which the amounts of component (a) is from 10 to 20%, of component (b) is 30 to 50% and of component (c) is from 30 to 50%, by weight.

3. A composition according to claim 2, in which the amounts of component (a) is approximately 15%, of component (b) is from 35 to 45% and of component (c) is from 40 to 45%, by weight.

4. A composition according to claim 3, in which the amounts of components (a), (b) and (c) are 15%, 40% and 45% by weight, respectively.

5. A method of printing or dyeing, which comprises applying a printing paste or dyeliquor which comprises a dye, water and an assistant of (a) octylphenyl pentaglycolether, (b) benzyl alcohol and (c) monophenyl glycolether in relative proportions a: b: c of 1 to 29; 20 to 70: 30 to 80 parts by weight, provided the total parts are 100, to a substrate.

6. A method of printing or dyeing polyamide fibres or fibres of cationic-active group modified polypropylene, which comprises applying to said fibres an acid or premetallized dye in the presence of water and an assistant of (a) octylphenyl pentaglycolether, (b) benzyl alcohol and (c) monophenyl glycolether in proportions of 10 to 20: 30 to 50: 30 to 50 parts by weight, provided the total parts are 100.

* * * * *